United States Patent
Aoki

(10) Patent No.: US 11,877,021 B2
(45) Date of Patent: Jan. 16, 2024

(54) TRANSMITTING DEVICE AND RECEIVING DEVICE

(71) Applicant: NIPPON HOSO KYOKAI, Tokyo (JP)

(72) Inventor: Shuichi Aoki, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 66 days.

(21) Appl. No.: 17/757,941

(22) PCT Filed: Dec. 25, 2020

(86) PCT No.: PCT/JP2020/048758
§ 371 (c)(1),
(2) Date: Jun. 24, 2022

(87) PCT Pub. No.: WO2021/132574
PCT Pub. Date: Jul. 1, 2021

(65) Prior Publication Data
US 2023/0040392 A1     Feb. 9, 2023

(30) Foreign Application Priority Data

Dec. 27, 2019   (JP) .................................. 2019-239564
Dec. 27, 2019   (JP) .................................. 2019-239570

(51) Int. Cl.
| | | |
|---|---|---|
| *H04N 21/2365* | (2011.01) | |
| *H04N 21/218* | (2011.01) | |
| *H04N 21/235* | (2011.01) | |

(52) U.S. Cl.
CPC ... *H04N 21/2365* (2013.01); *H04N 21/21805* (2013.01); *H04N 21/235* (2013.01)

(58) Field of Classification Search
CPC ......... H04N 21/2365; H04N 21/21805; H04N 21/235; H04N 21/845; H04N 21/85406; H04N 21/6587
See application file for complete search history.

(56) References Cited

U.S. PATENT DOCUMENTS

| | | | |
|---|---|---|---|
| 2018/0109754 A1 | 4/2018 | Kwon | |
| 2021/0021798 A1 | 1/2021 | Yip et al. | |

FOREIGN PATENT DOCUMENTS

| | | | |
|---|---|---|---|
| JP | 2013038521 A | 2/2013 | |
| JP | 2013061743 A | 4/2013 | |
| JP | 2018021068 A1 | 2/2018 | |

(Continued)

OTHER PUBLICATIONS

3rd Generation Partnership Project; Technical Specification Group SA WG4 Extended Reality in 5G; (Release 16), 3GPP TR 26.928 V0.5.0, Jul. 2019.

(Continued)

*Primary Examiner* — Anthony Bantamoi
(74) *Attorney, Agent, or Firm* — KENJA IP LAW PC

(57) ABSTRACT

A transmitting device (30, 30a) is configured to transmit, to a receiving device (40, 40a), a plurality of video signals captured from different positions, the plurality of video signals being grouped by a plurality of groups depending on imaging positions at which the video signals are captured. The transmitting device (30, 30a) comprises: a controller (32) configured to assign an ID for identifying each of the plurality of groups; and a communication interface (37) configured to transmit a video signal to which the ID is assigned, to the receiving device (40, 40a).

13 Claims, 12 Drawing Sheets

(56) References Cited

FOREIGN PATENT DOCUMENTS

| JP | 6306952 B2 | 4/2018 |
|----|------------|--------|
| JP | 2019008429 A | 1/2019 |
| JP | 2019047249 A | 3/2019 |
| JP | 2019145921 A | 8/2019 |
| WO | 2019194529 A1 | 10/2019 |
| WO | 2019195547 A1 | 10/2019 |

OTHER PUBLICATIONS

Information technology—Coded representation of immersive media—Part 2: Omnidirectional media format, ISO/IEC 23090-2, 2019, International Standard.

Mar. 16, 2021, International Search Report issued in the International Patent Application No. PCT/JP2020/048758.

Jun. 28, 2022, International Preliminary Report on Patentability issued in the International Patent Application No. PCT/JP2020/048758.

Nov. 27, 2023, the Extended European Search Report issued by the European Patent Office in the corresponding European Patent Application No. 20905870.0.

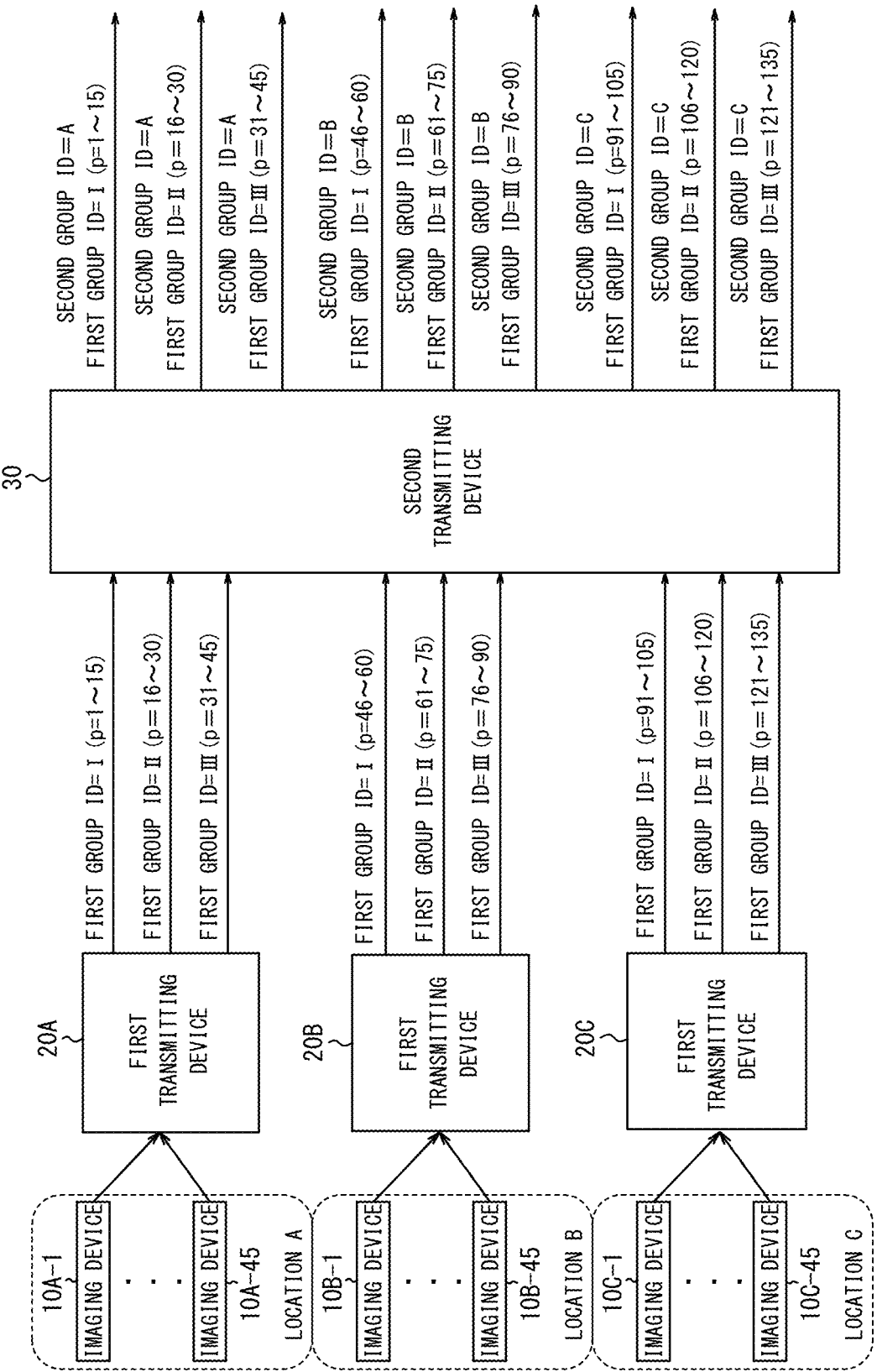

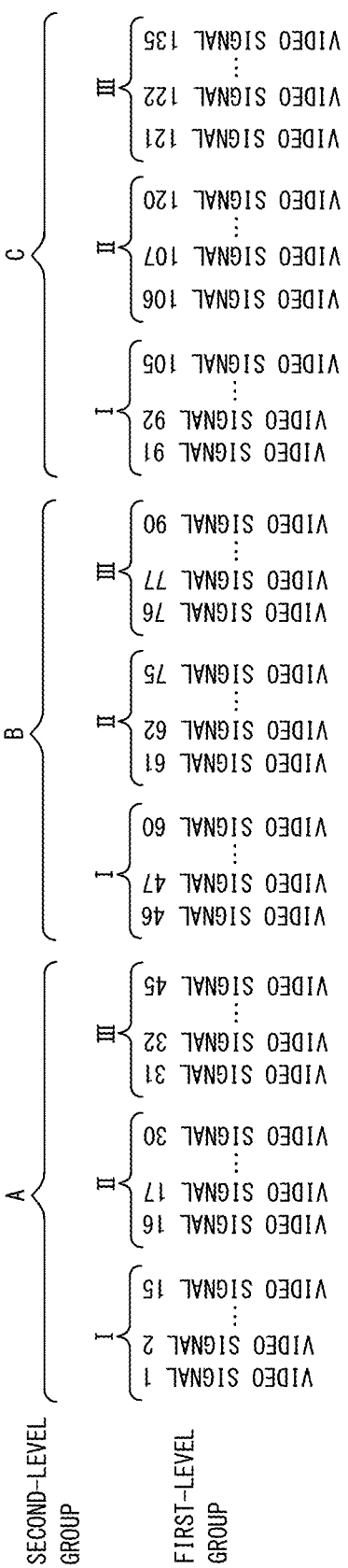

FIG. 5A
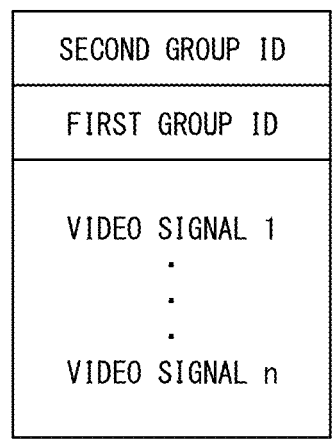
FIG. 5B
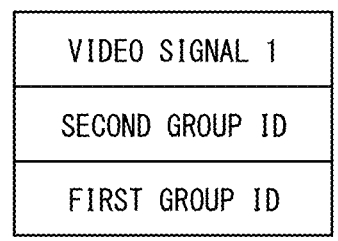
...
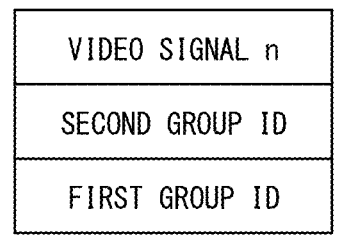

TRANSMITTING DEVICE AND RECEIVING DEVICE

CROSS REFERENCE TO RELATED APPLICATION

This application claims priority to and the benefit of Japanese Patent Applications No. 2019-239564 and No. 2019-239570 filed on Dec. 27, 2019, the entire disclosures of which are incorporated herein by reference.

TECHNICAL FIELD

The present disclosure relates to a transmitting device that transmits a plurality of video signals captured from different positions and a receiving device that receives the video signals.

BACKGROUND

As advanced types of 360-degree video, video systems that enable users to view 360-degree videos from desired viewpoints are studied. For example, NPL 1 describes use cases such as "3D Image Messaging" involving viewpoint movements in the range in which a user in a seated position moves his or her head as 3 DoF+ (degree of freedom) and "Immersive 6 DoF Streaming" involving viewpoint movements in the range in which a user moves freely as 6 DoF.

Typically, one camera captures video from one viewpoint. The use of a plurality of videos (multiview video) captured by a plurality of cameras makes it possible to generate video from an intermediate position between the video capturing positions (i.e. imaging positions). This is a known technology called viewpoint interpolation, intermediate viewpoint image generation, etc. (for example, see PTL 1)NPL 2 defines the omnidirectional media format (OMAF) as a file format for storing, for example, 360-degree video signals of predetermined viewpoints.

CITATION LIST

Patent Literature

PTL 1: JP 6306952 B2

Non-Patent Literature

NPL 1: 3GPP TR 26.928, "3rd Generation Partnership Project; Technical Specification Group SA WG4 Extended Reality in 5G; (Release 16)", ver 0.5.0, 2019-07

NPL 2: ISO/IEC 23090-2: 2019, "Information technology—Coded representation of immersive media—Part 2: Omnidirectional media format"

SUMMARY

Technical Problem

In viewpoint interpolation, a plurality of video signals captured from different positions are used to generate video from a desired viewpoint. On the other hand, for service that enables viewing video from the viewpoint of a freely moving user as in 6 DoF, it is necessary to capture a plurality of videos centering on many locations and perform viewpoint interpolation. However, the captured video signals are signals independent of each other, and there is no information for associating these information with each other. OMAF supports storing video signals of fixed viewpoints, but does not support processing a plurality of video signals in the case where the viewpoint is freely moved. Thus, there is no method for a receiving terminal to specify what kinds of video signals are present and how these video signals relate to each other, and no method for a receiving terminal to, in the case of receiving a plurality of video signals, specify how to associate these video signals.

It could therefore be helpful to provide a transmitting device and a receiving device that can easily specify video signals necessary for viewpoint interpolation in the case where a user changes his or her viewpoint position.

Solution to Problem

A transmitting device according to an embodiment is a transmitting device configured to transmit, to a receiving device, a plurality of video signals captured from different positions, the plurality of video signals being grouped by a plurality of groups depending on imaging positions at which the video signals are captured, the transmitting device comprising: a controller configured to assign an ID for identifying each of the plurality of groups; and a communication interface configured to transmit a video signal to which the ID is assigned, to the receiving device.

In an embodiment, the controller may be configured to specify a request ID that is an ID of a video signal corresponding to a change of a viewpoint position of a user of the receiving device, and the communication interface may be configured to transmit a video signal to which the request ID is assigned, to the receiving device.

In an embodiment, the communication interface may be configured to: transmit a plurality of video signals necessary to generate video corresponding to the viewpoint position of the user in a video signal group to which the request ID is assigned, in the case where the request ID is same as an ID of an immediately previously transmitted video signal; and transmit a default video signal in the video signal group to which the request ID is assigned, in the case where the request ID is different from the ID of the immediately previously transmitted video signal.

In an embodiment, the plurality of video signals may be grouped by the plurality of groups of a plurality of levels depending on the imaging positions, and the controller may be configured to assign a group ID for identifying each of the plurality of groups.

In an embodiment, a first-level group out of the plurality of groups of the plurality of levels may be a group to which a plurality of video signals used to generate video from a viewpoint different from an imaging position in the receiving device belong.

In an embodiment, a second-level group out of the plurality of groups of the plurality of levels may be one or more first-level groups to which a plurality of video signals captured in a same location belong.

In an embodiment, the plurality of video signals belonging to the first-level group may be compressed by predictive coding using a correlation between the video signals, when transmitted by the communication interface.

In an embodiment, the communication interface may be configured to simultaneously transmit all of the plurality of video signals to each of which the ID is assigned, to the receiving device.

In an embodiment, the plurality of video signals may be grouped by the plurality of groups depending on the imaging positions, and the controller may be configured to assign a group ID for identifying each of the plurality of groups.

In an embodiment, a first-level group out of the plurality of groups may be a group to which a plurality of video signals used to generate video from a viewpoint different from an imaging position in the receiving device belong.

In an embodiment, a second-level group out of the plurality of groups may be one or more first-level groups to which video signals captured in a same location belong.

In an embodiment, the plurality of video signals belonging to the first-level group may be compressed by predictive coding using a correlation between the video signals, when transmitted by the communication interface.

In an embodiment, the ID and the video signal may be stored in a file of ISO base media file format.

A receiving device according to an embodiment is a receiving device configured to receive a video signal transmitted from the foregoing transmitting device, the receiving device comprising: a controller configured to decode the video signal to generate decoded video, and acquire a viewpoint position of a user; and a communication interface configured to transmit viewpoint information indicating the viewpoint position of the user, to the transmitting device.

A receiving device according to an embodiment is a receiving device configured to receive a video signal transmitted from the foregoing transmitting device, the receiving device comprising a controller configured to decode the video signal to generate decoded video, and acquire a viewpoint position of a user, wherein the controller is configured to specify respective position information of imaging devices that capture a plurality of video signals necessary to generate video corresponding to the viewpoint position of the user, and perform viewpoint interpolation using decoded video corresponding to the position information.

Advantageous Effect

It is thus possible to easily specify video signals necessary for viewpoint interpolation in the case where a user changes his or her viewpoint position.

BRIEF DESCRIPTION OF THE DRAWINGS

In the accompanying drawings:

FIG. 3 is a diagram explaining second group IDs according to Embodiment 1;

FIG. 4 is a diagram explaining a hierarchical structure of video signals according to Embodiment 1;

FIG. 5A is a diagram illustrating an example of the structure of a file storing video signals according to Embodiment 1;

FIG. 5B is a diagram illustrating an example of the structure of a file storing video signals according to Embodiment 1;

DETAILED DESCRIPTION

Disclosed embodiments will be described in detail below, with reference to the drawings.

Embodiment 1

(Video Transmission System)

Figure 1:
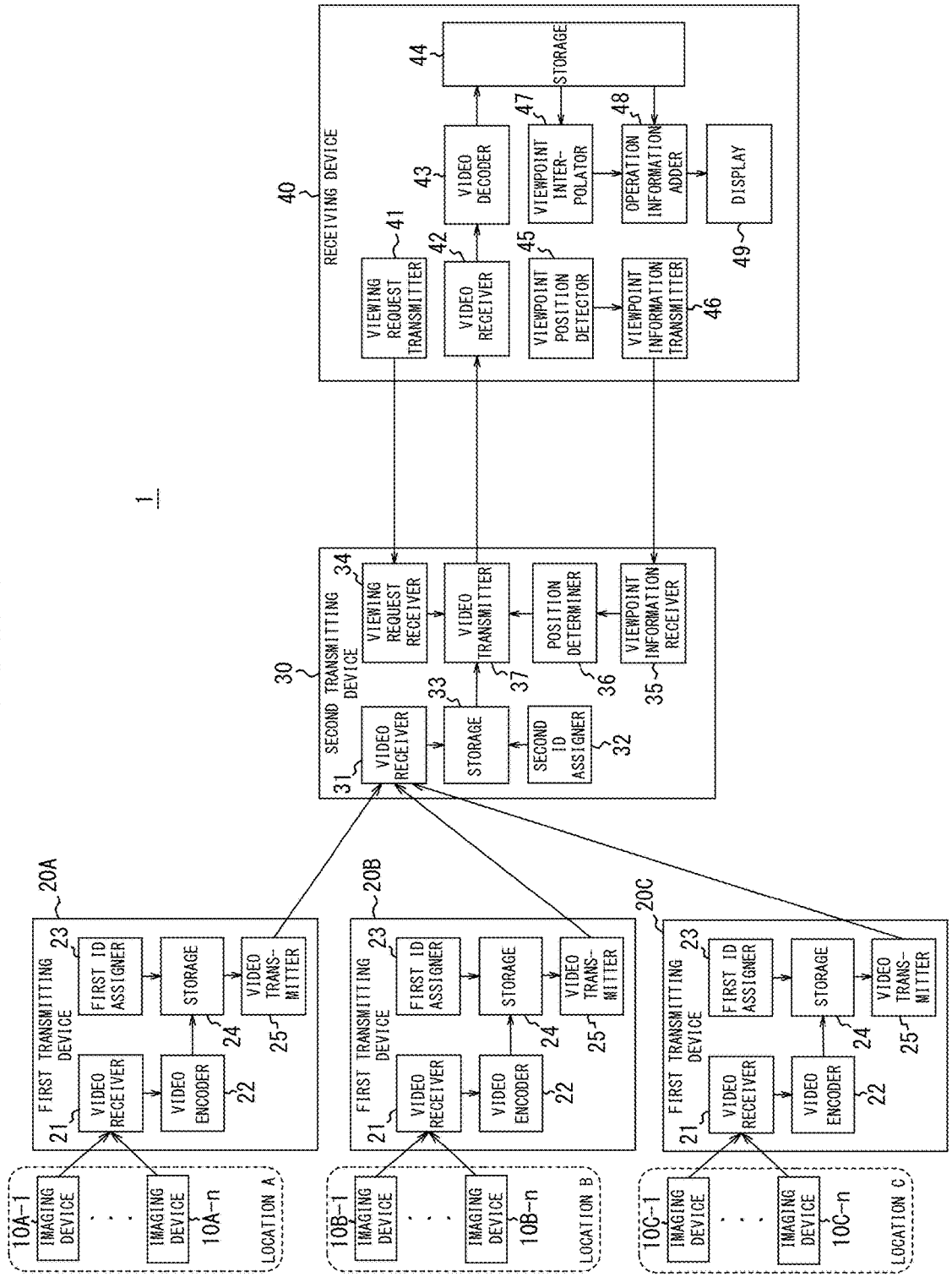
FIG. 1 is a block diagram illustrating an example of a video transmission system according to Embodiment 1.

First, a video transmission system according to Embodiment 1 will be described below. FIG. 1 is a diagram illustrating a video transmission system 1 according to Embodiment 1, and schematically illustrates transmission of a plurality of video signals captured in a plurality of locations. The video transmission system 1 includes a plurality of imaging devices (cameras) 10, a plurality of first transmitting devices 20, a second transmitting device 30, and a receiving device 40. In this specification, the term "location" denotes a predetermined area provided for a specific purpose, such as a venue, a stadium, a facility, or a park. In this embodiment, the video transmission system 1 includes three first transmitting devices 20. A first transmitting device 20A transmits video signals captured in a location A, a first transmitting device 20B transmits video signals captured in a location B, and a first transmitting device 20C transmits video signals captured in a location C.

Each imaging device 10 assigns metadata to a video signal captured at a predetermined position and transmits the video signal with the metadata to the corresponding first transmitting device 20. Herein, the metadata transmitted by the imaging device 10 is position information indicating the imaging position of the imaging device 10, and may include information indicating the imaging direction. The metadata may include distance information indicating the distance from the imaging device 10 to the captured object.

In detail, a plurality of imaging devices 10A installed in the location A each assign metadata to a video signal captured at a predetermined position in the location A and transmit the video signal with the metadata to the first transmitting device 20A. A plurality of imaging devices 10B installed in the location B each assign metadata to a video signal captured at a predetermined position in the location B and transmit the video signal with the metadata to the first transmitting device 20B. A plurality of imaging devices 10C installed in the location C each assign metadata to a video signal captured at a predetermined position in the location C and transmit the video signal with the metadata to the first transmitting device 20C.

The first transmitting device 20A receives the video signals and the metadata from the plurality of imaging devices 10A, assigns IDs to the video signals, and transmits them to the second transmitting device 30. The first transmitting device 20B receives the video signals and the metadata from the plurality of imaging devices 10B, assigns IDs to the video signals, and transmits them to the second transmitting device 30. The first transmitting device 20C receives the video signals and the metadata from the plurality of imaging devices 10C, assigns IDs to the video signals, and transmits them to the second transmitting device 30.

Transmission from the imaging devices 10 to the first transmitting devices 20 and transmission from the first transmitting devices 20 to the second transmitting device 30 may be performed using the Serial Digital Interface (SDI), the Internet Protocol (IP), or the like. More specifically, in the case of using SDI, transmission may be performed by 12G-SDI, 3G-SDI, HD-SDI, or the like. In the case of using IP, transmission may be performed by the Real-time Transport Protocol (RTP) based on the SMPTE (Society of Motion Picture and Television Engineers) ST 2110 standard. For example, in the case of transmitting a video signal without encoding it, SDI or IP may be used. In the case of transmitting a video signal after encoding it, IP may be used. In this embodiment, each imaging device 10 transmits a video signal to the corresponding first transmitting device 20 without encoding it, and the first transmitting device 20 transmits the video signal to the second transmitting device 30 after encoding it. Alternatively, each imaging device 10 may perform encoding, and each first transmitting device 20 may not perform encoding.

The second transmitting device 30 aggregates video signals transmitted from the plurality of first transmitting devices 20, and transmits the video signals to the receiving device 40 via a transmission path (for example, IP network). The video signals need not necessarily be aggregated in the second transmitting device 30, and the first transmitting devices 20 may transmit the video signals directly to the receiving device 40 via any of various transmission paths such as a broadcast transmission path, a terrestrial IMT (International Mobile Telecommunication) network, an optical fiber, and a Wi-Fi® (Wi-Fi is a registered trademark in Japan, other countries, or both) line.

The receiving device 40 may be any device capable of receiving video transmission from the first transmitting devices 20 or the second transmitting device 30. Examples of the receiving device 40 include a head-mounted display, virtual reality (VR) goggles, a tablet terminal, a smartphone, and a personal computer (PC).

(First Transmitting Device)

The first transmitting devices 20 according to Embodiment 1 will be described below.

Each first transmitting device 20 includes a video receiver 21, a video encoder 22, a first ID assigner 23, a storage 24, and a video transmitter 25, as illustrated in FIG. 1. The video encoder 22 and the first ID assigner 23 are included in a controller. The controller may be implemented by dedicated hardware such as an application specific integrated circuit (ASIC) or a field-programmable gate array (FPGA), implemented by a processor, or implemented by a combination of dedicated hardware and a processor. The video receiver 21 and the video transmitter 25 are included in a communication interface.

The video receiver 21 acquires video signals and metadata from the plurality of imaging devices 10, and outputs them to the video encoder 22.

The video encoder 22 encodes the video signals received from the video receiver 21 according to any video coding method such as H.265/HEVC (High Efficiency Video Coding), to generate the encoded video signals. The video encoder 22 may perform compression by predictive coding using correlation between video signals, for efficient transmission. The video encoder 22 outputs the encoded video signals to the storage 24.

In the present disclosure, the video signals are grouped by a plurality of groups depending on the imaging positions. The plurality of video signals captured by the plurality of imaging devices 10 can be grouped as video signal groups each used to generate video from a viewpoint position different from an imaging position (i.e. used for viewpoint interpolation). This grouping is referred to as "first-level grouping" to distinguish it from the below-described grouping. That is, each first-level group is a group to which a plurality of video signals used to generate video from a viewpoint different from an imaging position in the receiving device 40 belong.

The first ID assigner 23 inputs IDs (first group IDs) for identifying the respective first-level groups according to operation by an operator of the first transmitting device 20, and stores the first group IDs and the video signals in the storage 24 in association with each other. That is, the first ID assigner 23 assigns the first group IDs to the video signals.

Figure 2:
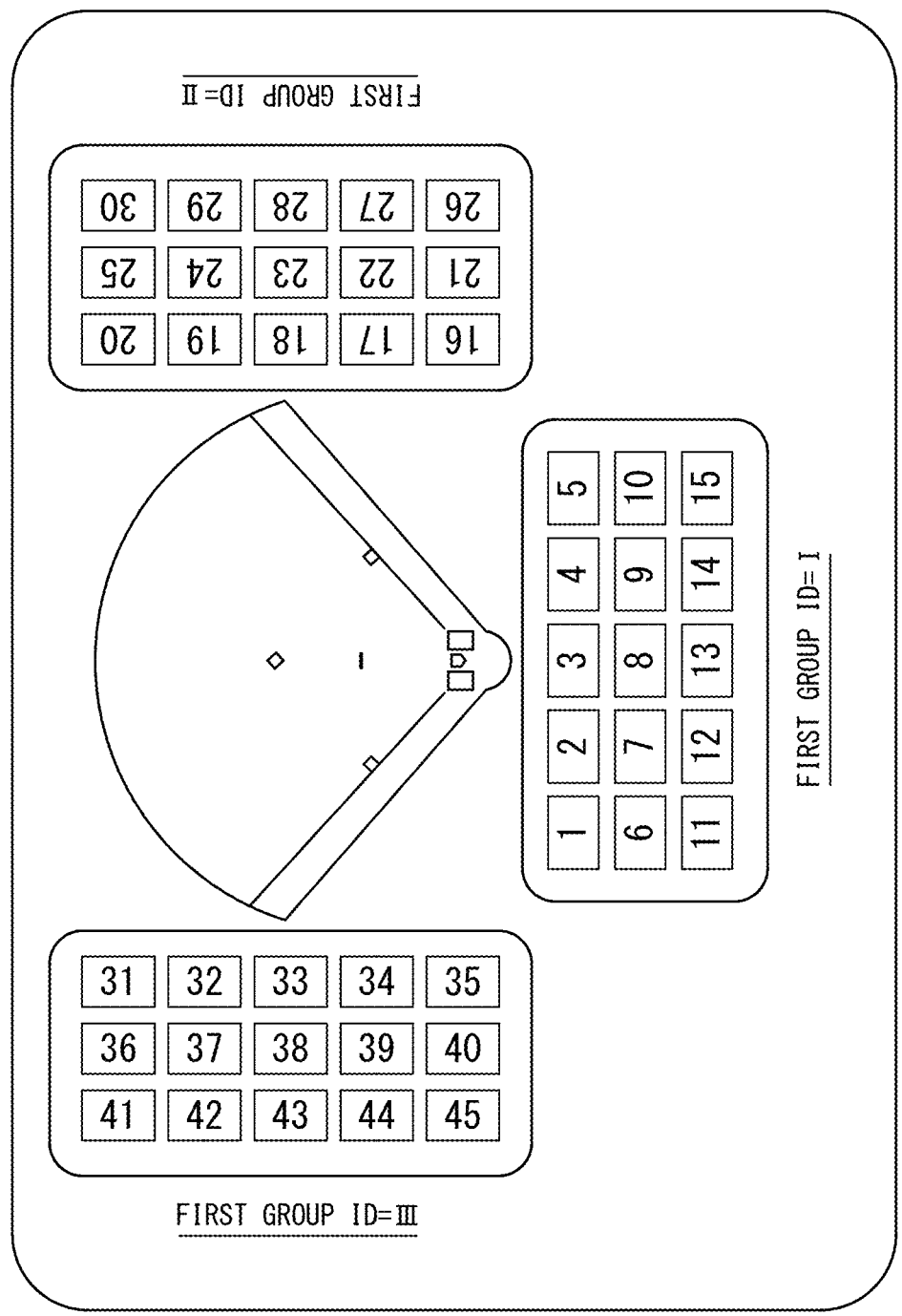
FIG. 2 is a diagram explaining first group IDs according to Embodiment 1.

The first group IDs will be described below, with reference to FIG. 2. FIG. 2 illustrates an example of capturing video at a baseball stadium. A total of 15 imaging devices 10, i.e. five imaging devices 10 in the horizontal direction and three imaging devices 10 in the vertical direction, are installed on the behind the catcher side of the baseball stadium. The respective position information p of these 15 imaging devices 10 are denoted as 1 to 15, for the sake of convenience. A total of 15 imaging devices 10, i.e. five imaging devices 10 in the horizontal direction and three imaging devices 10 in the vertical direction, are installed on the first base side of the baseball stadium. The respective position information p of these 15 imaging devices 10 are denoted as 16 to 30, for the sake of convenience. A total of 15 imaging devices 10, i.e. five imaging devices 10 in the horizontal direction and three imaging devices 10 in the vertical direction, are installed on the third base side of the baseball stadium. The respective position information p of these 15 imaging devices 10 are denoted as 31 to 45, for the sake of convenience. Although each imaging device 10 captures only forward video from the imaging position in the example illustrated in FIG. 2, the imaging device 10 may capture 360-degree surround video from the imaging position.

The receiving device 40 receives video signals captured by the imaging devices 10 of position information p=1 to 15, and performs viewpoint interpolation using the received video signals. Thus, the receiving device 40 can present, to a user, video of viewpoints in a certain range from the behind the catcher side. For example, in the case where the receiving device 40 is displaying a video signal captured by the imaging device 10 of position information p=8 and subsequently the user moves within a predetermined range (for example, within a radius of a few meters), the receiving device 40 can present, to the user, video corresponding to the viewpoint of the user. Likewise, in the case where the receiving device 40 receives video signals captured by the imaging devices 10 of position information p=16 to 30, the receiving device 40 can present, to the user, video of viewpoints in a certain range from the first base side. In the case where the receiving device 40 receives video signals captured by the imaging devices 10 of position information p=31 to 45, the receiving device 40 can present, to the user, video of viewpoints in a certain range from the third base side.

For example, in the case where video signals are captured by the imaging devices 10 of position information p=1 to 45, the first ID assigner 23 assigns "I" as a first group ID to the 15 video signals captured from the behind the catcher side, assigns "II" as a first group ID to the 15 video signals captured from the first base side, and assigns "III" as a first group ID to the 15 video signals captured from the third base side, as illustrated in FIG. 2. The first ID assigner 23 may assign a first group ID to every video signal. In the case where the video encoder 22 performs compression using correlation between video signals, the first ID assigner 23 may assign a first group ID only to each reference video signal (for example, video signals captured by the imaging devices 10 of position information p=8, 23, 38).

Referring back to FIG. 1, the storage 24 stores the encoded video signals and the metadata (position information) received from the video encoder 22, and the metadata (information indicating first group ID) received from the first ID assigner 23.

The video transmitter 25 transmits the encoded video signals and the metadata (position information and information indicating first group ID) stored in the storage 24, to the second transmitting device 30.

Each imaging device 10 and the whole or part of the corresponding first transmitting device 20 may be integrated. For example, in the case where the imaging device 10 has the function of the video encoder 22, the video receiver 21 in the first transmitting device 20 receives an encoded video signal from the imaging device 10 and outputs it to the storage 24.

(Second Transmitting Device)

The second transmitting device 30 according to Embodiment 1 will be described below.

The second transmitting device 30 includes a video receiver 31, a second ID assigner 32, a storage 33, a viewing request receiver 34, a viewpoint information receiver 35, a position determiner 36, and a video transmitter 37, as illustrated in FIG. 1. The second ID assigner 32 and the position determiner 36 are included in a controller. The controller may be implemented by dedicated hardware such as an ASIC or a FPGA, implemented by a processor, or implemented by a combination of dedicated hardware and a processor. The video receiver 31, the viewing request receiver 34, the viewpoint information receiver 35, and the video transmitter 37 are included in a communication interface.

The video receiver 31 receives encoded video signals and metadata transmitted from the plurality of first transmitting devices 20, and outputs the received encoded video signals and metadata to the storage 33.

The video signals captured by the plurality of imaging devices 10 can be grouped as video signal groups each of which is a group of video signals captured in the same location. This grouping is referred to as "second-level grouping" to distinguish it from the above-described first-level grouping. That is, each second-level group is one or more first-level groups to which a plurality of video signals captured in the same location belong.

The second ID assigner 32 inputs IDs (second group IDs) for identifying the respective second-level groups according to operation by an operator of the second transmitting device 30, and stores the second group IDs and the video signals in the storage 33 in association with each other. That is, the second ID assigner 32 assigns the second group IDs to the video signals.

The second group IDs will be described below, with reference to FIG. 3. In the example illustrated in FIG. 3, the second transmitting device 30 receives video signals captured in the location A from the first transmitting device 20A. Specifically, the second transmitting device 30 receives 15 video signals of first group ID=I captured by the imaging devices 10 of position information p=1 to 15, 15 video signals of first group ID=II captured by the imaging devices 10 of position information p=16 to 30, and 15 video signals of first group ID=III captured by the imaging devices 10 of position information p=31 to 45. The second transmitting device 30 also receives video signals captured in the location B from the first transmitting device 20B. Specifically, the second transmitting device 30 receives, from the first transmitting device 20B, 15 video signals of first group ID=I captured by the imaging devices 10 of position information p=46 to 60, 15 video signals of first group ID=II captured by the imaging devices 10 of position information p=61 to 75, and 15 video signals of first group ID=III captured by the imaging devices 10 of position information p=76 to 90. The second transmitting device 30 also receives video signals captured in the location C from the first transmitting device 20C. Specifically, the second transmitting device 30 receives, from the first transmitting device 20C, 15 video signals of first group ID=I captured by the imaging devices 10 of position information p=91 to 105, 15 video signals of first group ID=II captured by the imaging devices 10 of position information p=106 to 20, and 15 video signals of first group ID=III captured by the imaging devices 10 of position information p=121 to 135.

For example, the second ID assigner 32 assigns "A" as a second group ID to the 45 video signals captured in the location A, assigns "B" as a second group ID to the 45 video signals captured in the location B, and assigns "C" as a second group ID to the 45 video signals captured in the location C.

FIG. 4 illustrates a hierarchical structure in which video signals are grouped at two levels in the above-described manner. Suppose 45 video signals are captured in each of the locations A, B, and C, as illustrated in FIG. 3. In this case, the 45 video signals captured in the location A are classified as the group A of second group ID=A, and further classified, in the group A, into the 15 video signals belonging to first group ID=I, the 15 video signals belonging to first group ID=II, and the 15 video signals belonging to first group ID=III. The 45 video signals captured in the location B are classified as the group B of second group ID=B, and further classified, in the group B, into the 15 video signals belonging to first group ID=I, the 15 video signals belonging to first group ID=II, and the 15 video signals belonging to first group ID=III. The 45 video signals captured in the location C are classified as the group C of second group ID=C, and further classified, in the group C, into the 15 video signals belonging to first group ID=I, the 15 video signals belonging to first group ID=II, the 15 video signals belonging to first group ID=III.

Referring back to FIG. 1, the storage 33 stores the encoded video signals and the metadata received from the video receiver 31, and the metadata received from the second ID assigner 32.

The viewing request receiver 34 receives a viewing request indicating content to be viewed from the receiving device 40, and outputs the viewing request to the video transmitter 37.

The viewpoint information receiver 35 receives viewpoint information indicating the viewpoint position of the user of the receiving device 40 (for example, the position of the receiving device 40) from the receiving device 40, and outputs the viewpoint information to the position determiner 36. For example, the viewpoint position information is three-dimensional coordinates in a global coordinate system. Alternatively, the viewpoint position information may be three-dimensional coordinates in a local coordinate system relative to a default user position.

The position determiner 36, having received the viewpoint information from the viewpoint information receiver 35, determines whether a change of the viewpoint position of the user involves a change of ID (first group ID and second group ID). Specifically, the position determiner 36 specifies a request ID which is the ID of a video signal corresponding to the change of the viewpoint position of the user, and determines whether the request ID is the same as the ID of the immediately previously transmitted video signal.

In the case where the request ID is the same as the ID of the immediately previously transmitted video signal, the position determiner 36 outputs the respective position information of a plurality of imaging devices 10 that capture a plurality of video signals necessary to generate video corresponding to the viewpoint position of the user in a video signal group to which the request ID is assigned, to the video transmitter 37. For example, the position determiner 36 determines an imaging position corresponding to the viewpoint position of the user, and outputs, to the video transmitter 37, the respective position information of the imaging devices 10 located adjacent to or surrounding the imaging position.

In the case where the request ID is different from the ID of the immediately previously transmitted video signal, the position determiner 36 outputs the position information of an imaging device 10 that captures a default video signal in the video signal group to which the request ID is assigned, to the video transmitter 37.

The video transmitter 37 transmits one or more video signals to the receiving device 40. In this specification, "to transmit a video signal" means to transmit a video signal and metadata assigned to (i.e. multiplexed with) the video signal simultaneously. The video transmitter 37 may transmit only the metadata. Video signals belonging to a first-level group and transmitted by the video transmitter 37 may be compressed by predictive coding using correlation between video signals by the video encoder 22 in the first transmitting device 20.

The video transmitter 37, having received the viewing request from the viewing request receiver 34, acquires, from the storage 33, a default video signal of the content requested for viewing, all ID information (information indicating first group ID and second group ID) relating to the content requested for viewing, and the position information of the imaging device 10 representative of each first-level group, and transmits them to the receiving device 40. The receiving device 40 presents which viewpoint positions are selectable to the user, based on the ID information and the position information of the imaging device 10.

The video transmitter 37, having received the position information from the position determiner 36, acquires a video signal captured by the imaging device 10 having the position information (i.e. a video signal corresponding to the position information) from the storage 33, and transmits it to the receiving device 40. In detail, in the case where the request ID is the same as the ID of the immediately previously transmitted video signal, the video transmitter 37 transmits the plurality of video signals necessary to generate the video corresponding to the viewpoint position of the user in the video signal group to which the request ID is assigned. In the case where the request ID is different from the ID of the immediately previously transmitted video signal, the video transmitter 37 transmits the default video signal in the video signal group to which the request ID is assigned.

FIGS. 5A and 5B are each a diagram illustrating an example of a file structure in the case of storing IDs and video signals in a file of ISO base media file format such as OMAF. The basic unit of the format is called "box".

In the file structure illustrated in FIG. 5A, when storing n video signals having a common second group ID and first group ID in a file, the n video signals are stored under boxes indicating the second group ID and the first group ID, thus indicating the group to which the video signals belong. In the file structure illustrated in FIG. 5B, when storing n video signals having a common second group ID and first group ID in a file, a track storing each video signal is stored together with boxes indicating the second group ID and the first group ID, thus indicating the group to which the video signals belong.

Although two-level grouping is described in this embodiment, grouping at three or more levels may be performed depending on content according to operation by the user. In the case of grouping at three or more levels, too, each video signal can be identified through hierarchization. For example, one or more second-level groups to which video signals captured in the same region belong may be grouped as a third-level group.

(Receiving Device)

The receiving device 40 according to Embodiment 1 will be described below.

The receiving device 40 includes a viewing request transmitter 41, a video receiver 42, a video decoder 43, a storage 44, a viewpoint position detector 45, a viewpoint information transmitter 46, a viewpoint interpolator 47, an operation information adder 48, and a display 49, as illustrated in FIG. 1. The video decoder 43, the viewpoint position detector 45, the viewpoint interpolator 47, and the operation information adder 48 are included in a controller. The controller may be implemented by dedicated hardware such as an ASIC or a FPGA, implemented by a processor, or implemented by a combination of dedicated hardware and a processor. The viewing request transmitter 41, the video receiver 42, and the viewpoint information transmitter 46 are included in a communication interface.

The viewing request transmitter 41 transmits a viewing request indicating content selected by the user of the receiving device 40, to the second transmitting device 30.

The video receiver 42 receives video signals and metadata (position information and ID information) from the second transmitting device 30. The video receiver 42 outputs the received video signals and metadata to the video decoder 43 in association with each other.

The video decoder 43 decodes the video signals to generate decoded video, and outputs the decoded video to the storage 44.

The storage 44 stores the decoded video generated by the video decoder 43.

The viewpoint position detector 45 detects the viewpoint position of the user, and outputs viewpoint information indicating the detected viewpoint position to the viewpoint information transmitter 46. For example, the viewpoint position detector 45 acquires an image of the user's eyes captured by an imaging device included in the receiving device 40 and analyzes the image using any known technology, to detect the viewpoint position. The viewpoint position detector 45 may be a line-of-sight sensor included in the receiving device 40 separately from the controller. The controller acquires the viewpoint position of the user by the viewpoint position detector 45.

The viewpoint information transmitter 46 transmits the viewpoint information detected by the viewpoint position detector 45, to the second transmitting device 30. The viewpoint information transmitter 46 may transmit the viewpoint information to the second transmitting device 30 at certain intervals, or transmit the viewpoint information to the second transmitting device 30 only in the case where the amount of change of the viewpoint position is greater than a threshold.

The viewpoint interpolator 47 performs viewpoint interpolation using a plurality of decoded videos (i.e. decoded videos obtained by decoding video signals corresponding to the position information determined by the position determiner 36) having a common first group ID and second group ID stored in the storage 44, to generate video corresponding to the viewpoint position detected by the viewpoint position detector 45. Any known technology (for example, see PTL 1) may be used for viewpoint interpolation. The viewpoint interpolator 47 outputs the viewpoint-interpolated decoded video to the operation information adder 48.

The operation information adder 48 acquires default decoded video from the storage 44, adds operation information to the decoded video, and outputs them to the display 49, in response to a viewing request by the user. After the viewpoint interpolation by the viewpoint interpolator 47, the operation information adder 48 acquires the viewpoint-interpolated decoded video from the viewpoint interpolator 47, adds operation information to the decoded video, and outputs them to the display 49.

Herein, "operation information" is information indicating, to the user, an operation method for changing the viewpoint position. For example, the operation information is information indicating an operation method for changing to a different viewpoint position in the same location or for changing to a viewpoint position in a different location. The operation information may include an icon. The user can request a change of the viewpoint position, by operating based on the operation information. For example, in the case where the receiving device 40 is a head-mounted display, the user may perform the operation based on the operation information by the direction of the line of sight. In this case, the line-of-sight direction is detected by the viewpoint position detector 45. In the case where the receiving device 40 is a tablet terminal, the user may perform the operation based on the operation information by screen operation such as flicking or swiping. In the case where the receiving device 40 is a non-mobile or non-portable device having a flat panel display, the user may perform the operation based on the operation information using a remote control.

The display 49 is, for example, a liquid crystal display or an organic electroluminescent (EL) display. The display 49 displays the decoded video and the operation information received from the operation information adder 48.

Figure 6:
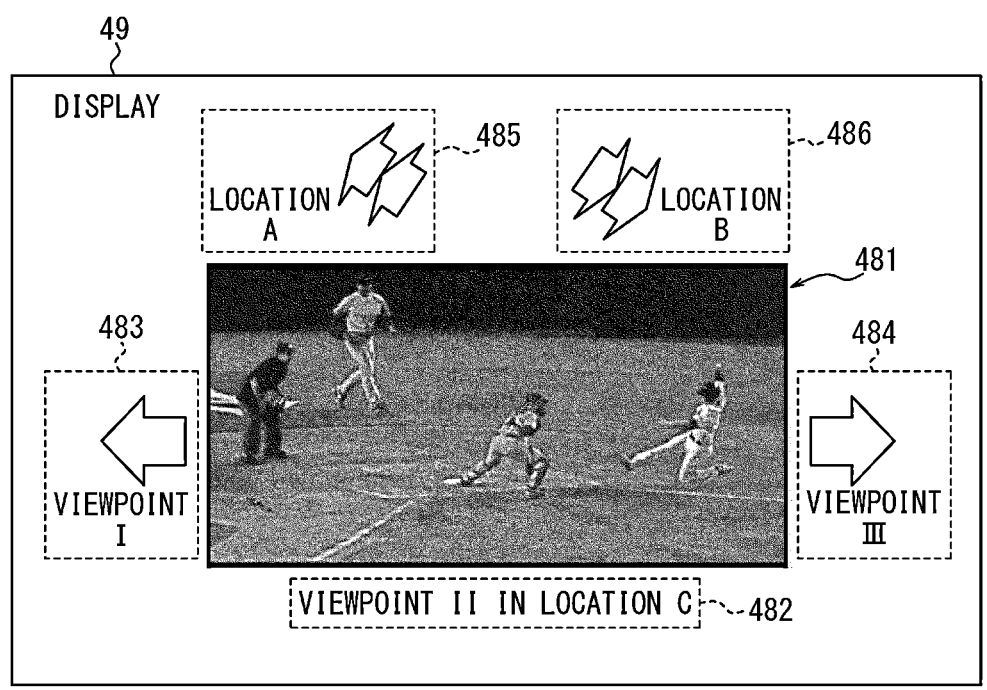
FIG. 6 is a diagram illustrating an example of display by a receiving device according to Embodiment 1.

FIG. 6 illustrates an example of display of video and operation information by the display 49. In the example illustrated in FIG. 6, video 481 and operation information 482 to 486 are displayed. The operation information 482 indicates that the currently displayed video 481 is video based on a video group of first group ID=II in the location C. The operation information 483 indicates that the viewpoint position in the location C can be changed (i.e. the currently displayed video 481 can be changed to video based on a video group of first group ID=I in the location C) by a predetermined operation. The operation information 484 indicates that the viewpoint position in the location C can be changed (i.e. the currently displayed video 481 can be changed to video based on a video group of first group ID=III in the location C) by a predetermined operation. The operation information 485 indicates that the viewpoint position can be changed to a different location (i.e. the currently displayed video 481 can be changed to video captured in the location A) by a predetermined operation. The operation information 486 indicates that the viewpoint position can be changed to a different location (i.e. the currently displayed video 481 can be changed to video captured in the location B) by a predetermined operation.

When the user operates based on operation information displayed by the display 49, the viewpoint position detector 45 detects the viewpoint position corresponding to the operation. Thus, the user can request the second transmitting device 30 to change the viewpoint position.

(Operation Sequence)

Figure 7:
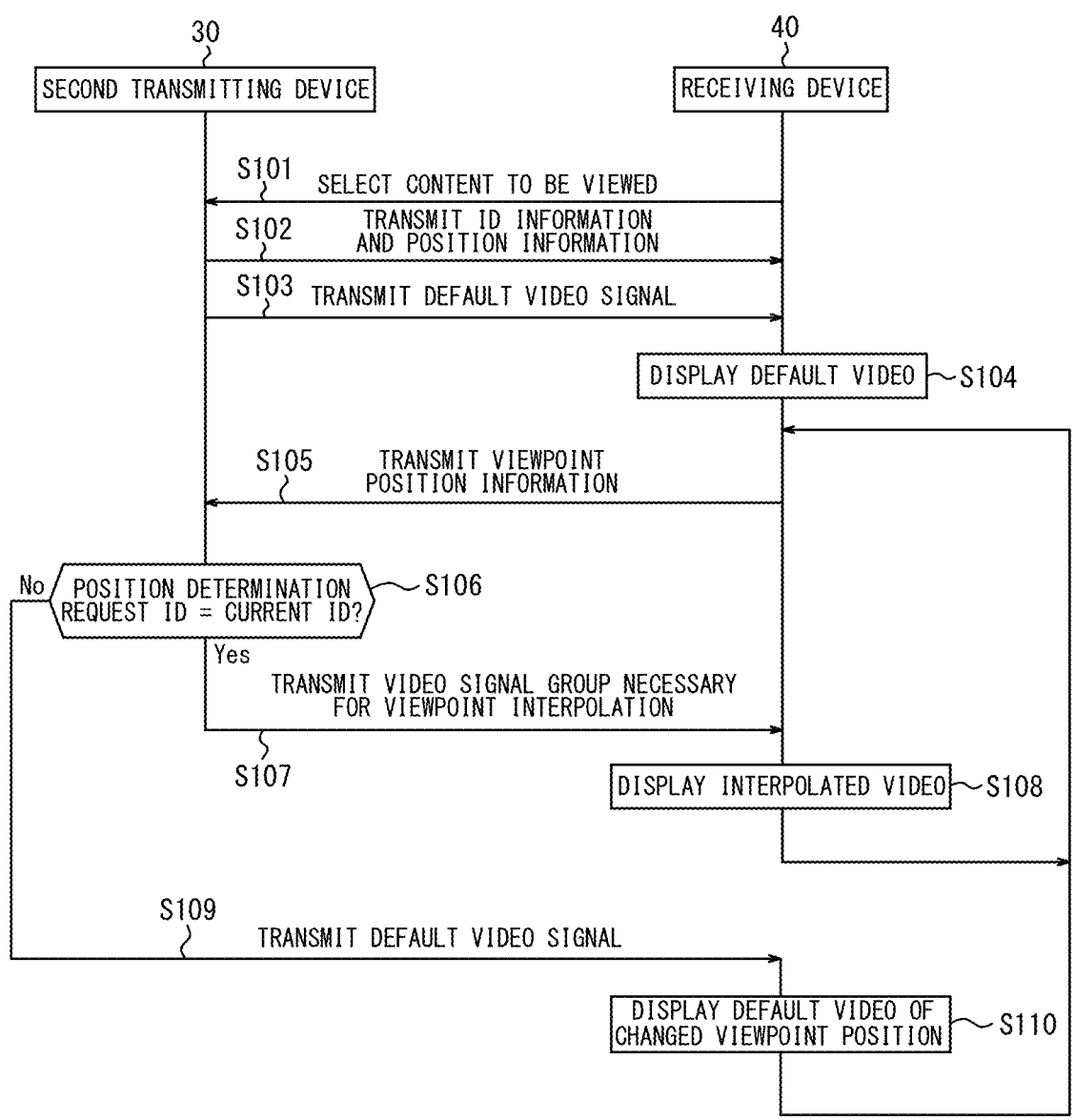
FIG. 7 is a sequence diagram illustrating an example of the operation of the video transmission system according to Embodiment 1.

The operation sequence of the video transmission system 1 according to this embodiment will be described below, with reference to FIG. 7. FIG. 7 is a diagram illustrating the operation sequence between the second transmitting device 30 and the receiving device 40.

In step S101, the receiving device 40 transmits a viewing request indicating content selected by the user to the second transmitting device 30, by the viewing request transmitter 41. The second transmitting device 30 receives the viewing request transmitted from the receiving device 40, by the viewing request receiver 34.

In step S102, the second transmitting device 30 transmits, for the content requested for viewing by the receiving device 40, all ID information and the position information of the imaging device 10 representative of each first-level group to the receiving device 40, by the video transmitter 37. The receiving device 40 receives the foregoing information relating to the content requested for viewing from the second transmitting device 30, by the video receiver 42. For example, in the case where the imaging devices 10 are installed as illustrated in FIG. 2, the position information of the imaging device 10 representative of each first-level group is the position information of the imaging device 10 located at the center of the first-level group, i.e. position information p=8, 23, 38. The video transmitter 37 may transmit, for each first-level group, position information of each of a plurality of imaging devices 10 to the receiving device 40.

In step S103, the second transmitting device 30 transmits a default video signal to the receiving device 40 for the content requested for viewing by the receiving device 40, by the video transmitter 37. It is assumed here that the second transmitting device 30 sets a default video signal for each content beforehand. For example, in the case where the video signals relating to the content requested for viewing are grouped as illustrated in FIG. 4, the default video is video signal 8 of second group ID=A and first group ID=I (video signal captured by the imaging device 10 of position information p=8 located at the center on the behind the catcher side in FIG. 2).

In step S104, the receiving device 40 receives the default video signal of the content requested for viewing from the second transmitting device 30, by the video receiver 42. The receiving device 40 decodes the video signal by the video decoder 43, and displays the default video by the display 49.

In step S105, the receiving device 40 transmits viewpoint information to the second transmitting device 30, by the viewpoint information transmitter 46.

In step S106, the second transmitting device 30 specifies a request ID which is the ID of a video signal corresponding to a change of the viewpoint position of the user, by the position determiner 36. In the case where the request ID is the same as the ID of the immediately previously transmitted video signal, the second transmitting device 30 advances the process to step S107. In the case where the request ID is different from the ID of the immediately previously transmitted video signal, the second transmitting device 30 advances the process to step S109.

In step S107, the second transmitting device 30 transmits a plurality of video signals necessary to generate video corresponding to the viewpoint position of the user to the receiving device 40, by the video transmitter 37.

In step S108, the receiving device 40 performs viewpoint interpolation using the plurality of video signals necessary for viewpoint interpolation received from the second transmitting device 30, by the viewpoint interpolator 47. The receiving device 40 displays the viewpoint-interpolated video by the display 49. The receiving device 40 then returns the process to step S105.

In step S109, the second transmitting device 30 transmits, to the receiving device 40, a default video signal in a video signal group to which the request ID is assigned, by the video transmitter 37.

In step S110, the receiving device 40 receives the default video signal of the changed viewpoint position from the second transmitting device 30, by the video receiver 42. The receiving device 40 decodes the video signal by the video decoder 43, and displays the default video by the display 49. The receiving device 40 then returns the process to step S105.

As described above, the video transmission system 1 that transmits a plurality of video signals captured at different positions groups the video signals and assigns IDs. As a result of grouping the plurality of video signals as first-level groups, a plurality of video signals used for viewpoint interpolation can be specified easily. As a result of grouping the plurality of video signals as second-level groups, possible viewpoint position changes can be presented to the user. The user can then view video of the viewpoint position changed within the same location or changed to a different location, by performing operation according to operation information displayed by the display 49.

Embodiment 2

Figure 8:
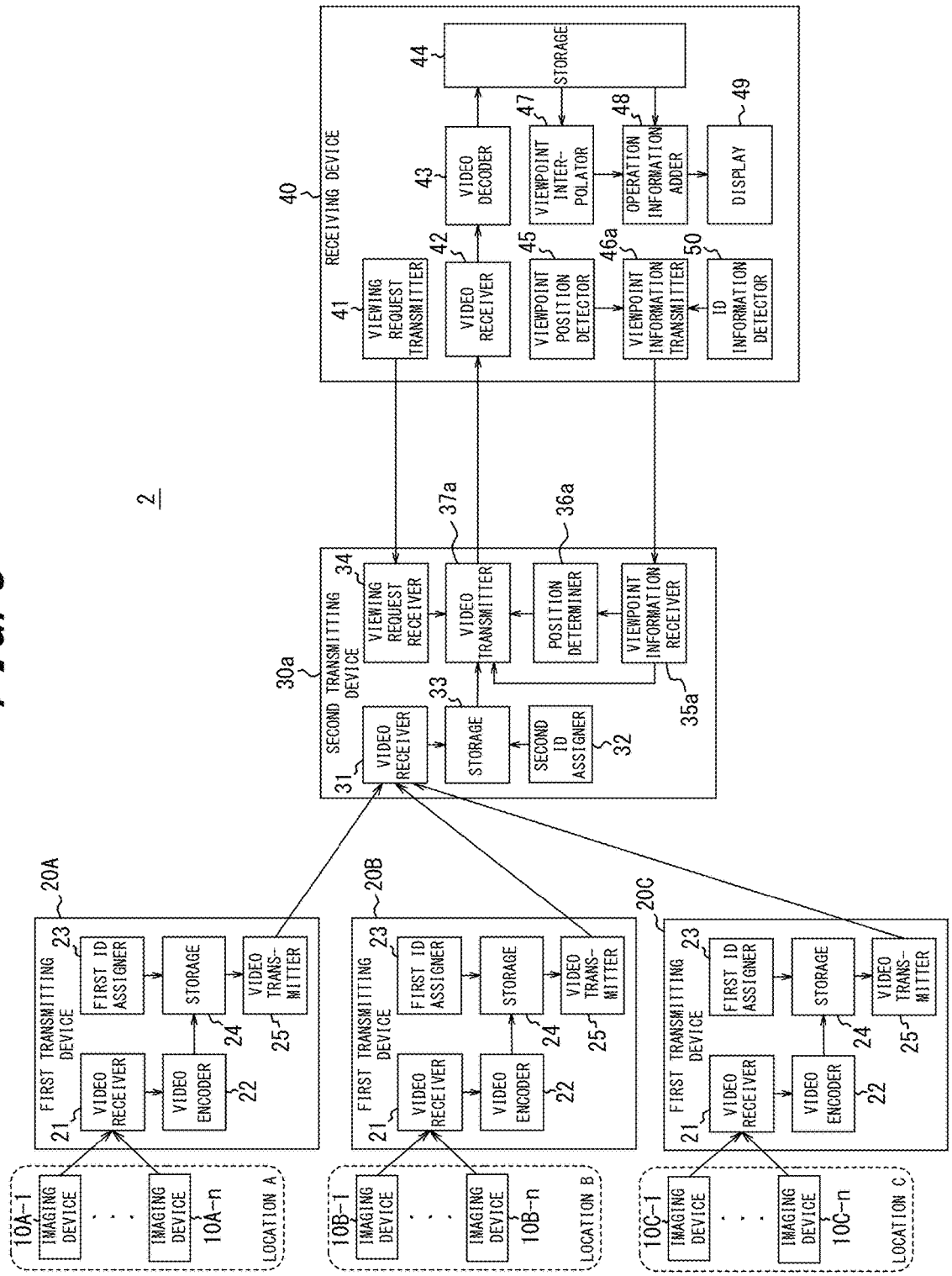
FIG. 8 is a block diagram illustrating an example of a video transmission system according to Embodiment 2.

A video transmission system according to Embodiment 2 will be described below. FIG. 8 is a diagram illustrating a video transmission system 2 according to Embodiment 2. The video transmission system 2 includes a plurality of imaging devices 10, a plurality of first transmitting devices 20, a second transmitting device 30a, and a receiving device 40a. The imaging devices 10 and the first transmitting devices 20 in this embodiment are the same as the imaging devices 10 and the first transmitting devices 20 in Embodiment 1 respectively, and accordingly their description is omitted. The second transmitting device 30a and the receiving device 40a in this embodiment are partly the same as the second transmitting device 30 and the receiving device 40 in Embodiment 1 respectively, and the same components are given the same reference signs and their description is omitted as appropriate.

The receiving device 40a in this embodiment differs from the receiving device 40 in Embodiment 1 in that an ID information detector 50 is further included and a viewpoint information transmitter 46a is included instead of the viewpoint information transmitter 46. The ID information detector 50 is included in the controller, too.

The ID information detector 50, in the case where the user performs operation based on operation information displayed by the display 49 to request a change of the viewpoint position, detects an ID (request ID) assigned to a video signal group corresponding to the new viewpoint position requested by the user. The ID information detector 50 outputs the detected request ID to the viewpoint information transmitter 46a as viewpoint information. For example, in the case where the user swipes along the arrow icon indicated by the operation information 483 in FIG. 6, the ID information detector 50 detects first group ID=I and second group ID=C as the request ID. In the case where the user swipes along the arrow icon indicated by the operation information 485 in FIG. 6, the ID information detector 50 detects first group ID=default value and second group ID=A as the request ID. In the case where the first group ID is a default value, the request ID may include only the second group ID.

The viewpoint information transmitter 46a transmits the viewpoint information detected by the viewpoint position detector 45 to the second transmitting device 30a, in the case where the user does not perform operation based on operation information displayed by the display 49. The viewpoint information transmitter 46a transmits the viewpoint information (request ID) detected by the ID information detector 50 to the second transmitting device 30a, in the case where the user performs operation based on operation information displayed by the display 49.

The second transmitting device 30a in this embodiment differs from the second transmitting device 30 in Embodiment 1 in that a viewpoint information receiver 35a, a position determiner 36a, and a video transmitter 37a are included instead of the viewpoint information receiver 35, the position determiner 36, and the video transmitter 37 respectively.

The viewpoint information receiver 35a, having received viewpoint information not including a request ID, outputs the viewpoint information to the position determiner 36a, as in Embodiment 1. The viewpoint information receiver 35a, having received viewpoint information including a request ID, specifies position information corresponding to a default video signal in a video signal group to which the request ID is assigned, and transmits the specified position information to the video transmitter 37a.

The position determiner 36a, having received the viewpoint information not including a request ID from the viewpoint information receiver 35a, outputs the respective position information of a plurality of imaging devices 10 that capture a plurality of video signals necessary to generate video corresponding to the viewpoint position of the user, to the video transmitter 37a. The position determiner 36a, having received the viewpoint information including a request ID from the viewpoint information receiver 35a, outputs position information corresponding to a default video signal in a video signal group to which the request ID is assigned, to the video transmitter 37a.

The video transmitter 37a, having received the position information from the viewpoint information receiver 35a or the position determiner 36a, acquires a video signal captured by the imaging device 10 having the position information (video signal corresponding to the position information) from the storage 33, and transmits the video signal to the receiving device 40a.

(Operation Sequence)

Figure 9:
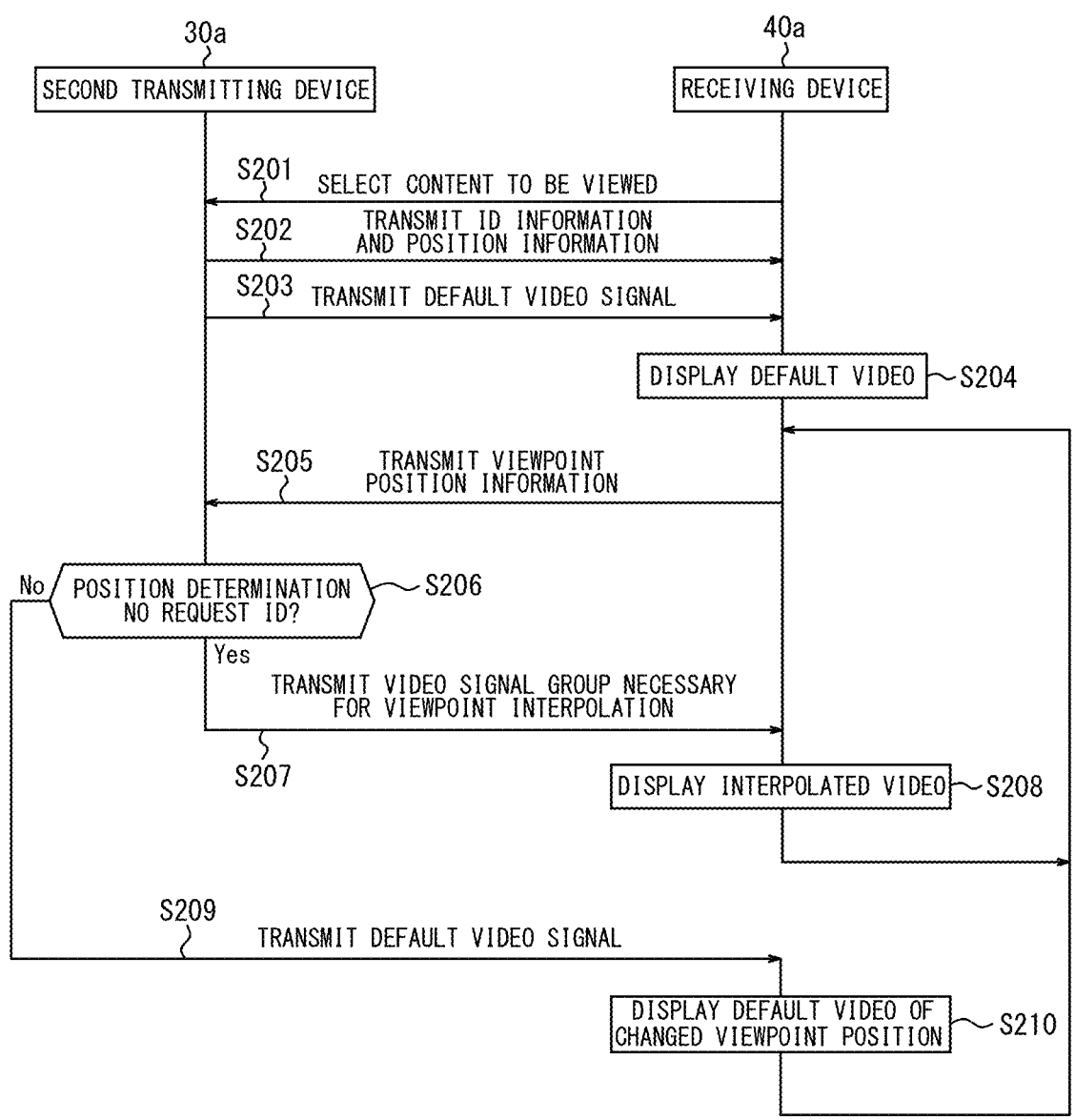
FIG. 9 is a sequence diagram illustrating an example of the operation of the video transmission system according to Embodiment 2.

The operation sequence of the video transmission system 2 according to this embodiment will be described below, with reference to FIG. 9. FIG. 9 is a diagram illustrating the operation sequence between the second transmitting device 30a and the receiving device 40a. Steps S201 to S204 are the same as steps S101 to S104 in Embodiment 1 described above with reference to FIG. 7, and accordingly their description is omitted.

In step S205, the receiving device 40a transmits viewpoint information to the second transmitting device 30a, by the viewpoint information transmitter 46a.

In step S206, the second transmitting device 30a determines whether the viewpoint information includes a request ID, by the position determiner 36a. In the case where the viewpoint information does not include a request ID, the second transmitting device 30a advances the process to step S207. In the case where the viewpoint information includes a request ID, the second transmitting device 30a advances the process to step S209.

Steps S207 to S210 are the same as steps S107 to S110 in Embodiment 1 described above with reference to FIG. 7, and accordingly their description is omitted.

As described above, in this embodiment, the detection of a request ID is performed not by the second transmitting device 30a but by the receiving device 40a. In this case, too, the same effects as in Embodiment 1 can be achieved.

Embodiment 3

Figure 10:
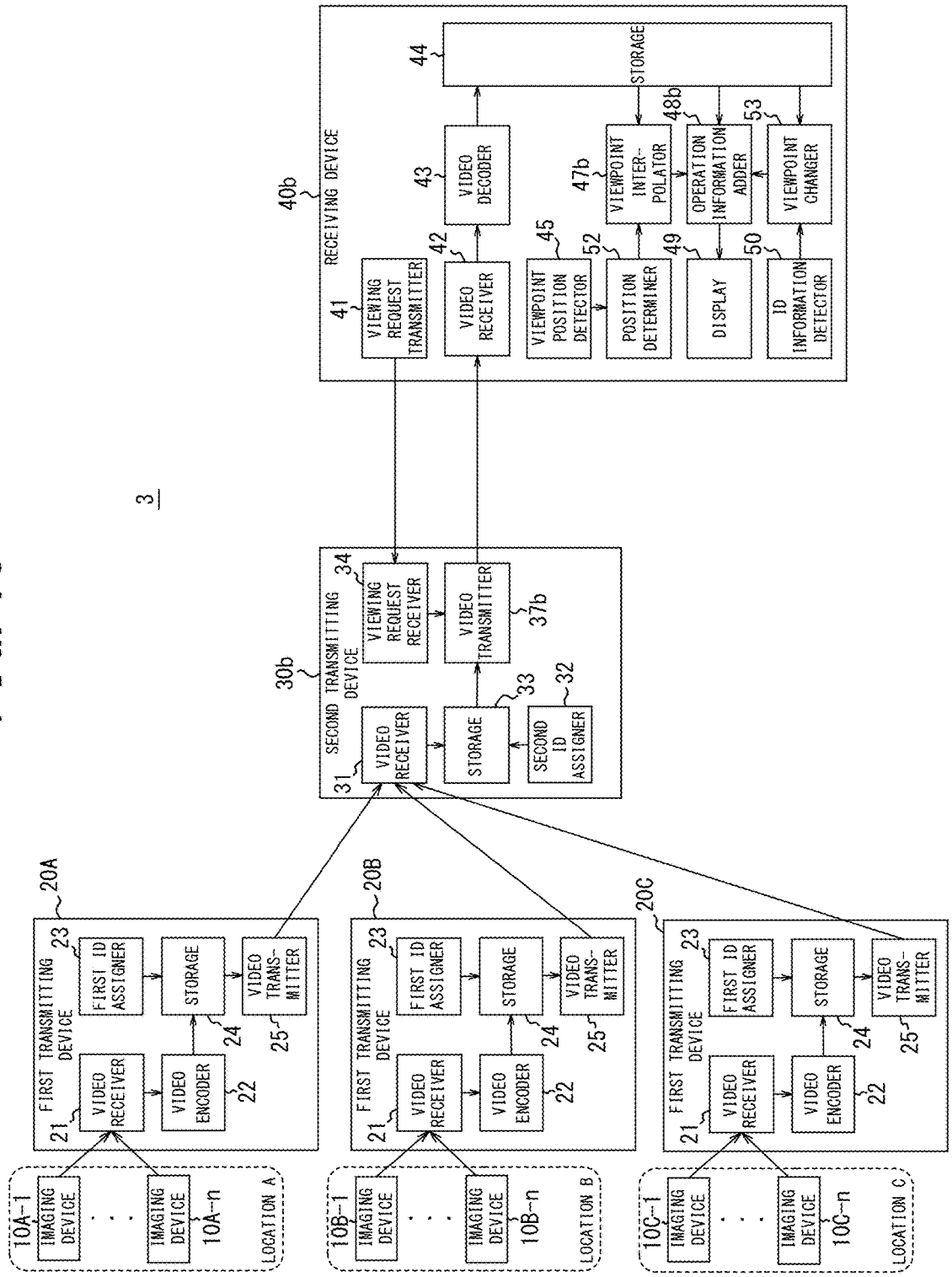
FIG. 10 is a block diagram illustrating an example of a video transmission system according to Embodiment 3.

A video transmission system according to Embodiment 3 will be described below. FIG. 10 is a diagram illustrating a video transmission system 3 according to Embodiment 3. The video transmission system 3 includes a plurality of imaging devices 10, a plurality of first transmitting devices 20, a second transmitting device 30b, and a receiving device 40b. The imaging devices 10 and the first transmitting devices 20 in this embodiment are the same as the imaging devices 10 and the first transmitting devices 20 in Embodiment 1 respectively, and accordingly their description is omitted. The second transmitting device 30b and the receiving device 40b in this embodiment are partly the same as the second transmitting device 30 and the receiving device 40 in Embodiment 1 respectively, and the same components are given the same reference signs and their description is omitted as appropriate.

In each of Embodiments 1 and 2 described above, a transmission path for bidirectional transmission is assumed as the transmission path between the second transmitting device 30 or 30a and the receiving device 40 or 40a. In this embodiment, on the other hand, a transmission path for unidirectional transmission is assumed as the transmission path between the second transmitting device 30b and the receiving device 40b. The transmission path may be a transmission path supporting IP multicast, or a transmission path supporting broadcast waves. IP multicast through a communication line may be transmission by broadcast waves. A broadcast system supporting IP packet transmission such as ISDB (Integrated Services Digital Broadcasting) -S3 or ATSC (Advanced Television Systems Committee) 3.0 is considered to be a transmission path similar to IP multicast through a communication line.

The second transmitting device 30b in this embodiment differs from the second transmitting device 30 in Embodiment 1 in that the viewpoint information receiver 35 and the position determiner 36 are not included and a video transmitter 37b is included instead of the video transmitter 37.

In the case of performing IP multicast transmission through a communication line, the video transmitter 37b, having received a viewing request from the viewing request receiver 34, acquires all video signals relating to content requested for viewing from the storage 33. The video transmitter 37b then transmits the all video signals simultaneously to the receiving device 40b. Each video signal is multiplexed with metadata (ID information and position information), as in the other embodiments. For example, in the case where the video signals for the content requested for viewing are grouped as illustrated in FIG. 4, the video transmitter 37b transmits the 145 video signals simultaneously to the receiving device 40b.

In the case of performing broadcast transmission, there is no viewing request by the user, and the video transmitter 37b always acquires all video signals relating to all content from the storage 33 without reference to a viewing request from the receiving device 40b. The video transmitter 37b then transmits the all video signals relating to all content simultaneously to the receiving device 40b. That is, content is selected in the receiving device 40b. Hence, in the case of the broadcast transmission path, the viewing request transmitter 41 and the viewing request receiver 34 may be omitted.

The receiving device 40b in this embodiment differs from the receiving device 40 in Embodiment 1 in that the viewpoint information transmitter 46 is not included, an ID information detector 50, a position determiner 52, and a viewpoint changer 53 are further included, and a viewpoint interpolator 47b and an operation information adder 48b are included instead of the viewpoint interpolator 47 and the operation information adder 48 respectively. The ID information detector 50, the position determiner 52, and the viewpoint changer 53 are included in the controller, too.

The position determiner 52, having received viewpoint information from the viewpoint position detector 45, determines whether the viewpoint position changes. For example, in the case where the amount of change of the viewpoint position is greater than a threshold, the position determiner 52 determines that the viewpoint position changes. In the case where the position determiner 52 determines that the viewpoint position changes, the position determiner 52 specifies the respective position information of a plurality of imaging devices 10 that capture a plurality of video signals necessary to generate video corresponding to the viewpoint position of the user, and outputs the specified position information to the viewpoint interpolator 47b.

The viewpoint interpolator 47b, having received the position information from the position determiner 52, acquires decoded video corresponding to the position information from the storage 44. The viewpoint interpolator 47b performs viewpoint interpolation using the acquired decoded video, and outputs the viewpoint-interpolated decoded video to the operation information adder 48b.

The ID information detector 50, in the case where the user performs operation based on operation information displayed by the display 49 to request a change of the viewpoint position, detects an ID (request ID) assigned to a video signal group corresponding to the new viewpoint position requested by the user. The ID information detector 50 outputs the detected request ID to the viewpoint changer 53.

The viewpoint changer 53, having received the request ID from the ID information detector 50, acquires default decoded video out of decoded video of a video signal group to which the request ID is assigned from the storage 44, and outputs the default decoded video to the operation information adder 48b.

The operation information adder 48b, during content playback, first acquires default decoded video from the storage 44, adds operation information to the decoded video, and outputs them to the display 49. After the viewpoint interpolation by the viewpoint interpolator 47b, the operation information adder 48b acquires the viewpoint-interpolated decoded video from the viewpoint interpolator 47b, adds operation information to the decoded video, and outputs them to the display 49. After the detection of the request ID by the viewpoint changer 53, the operation information adder 48b acquires default decoded video of the changed viewpoint position from the viewpoint changer 53, adds operation information to the decoded video, and outputs them to the display 49.

(Operation Sequence)

Figure 11:
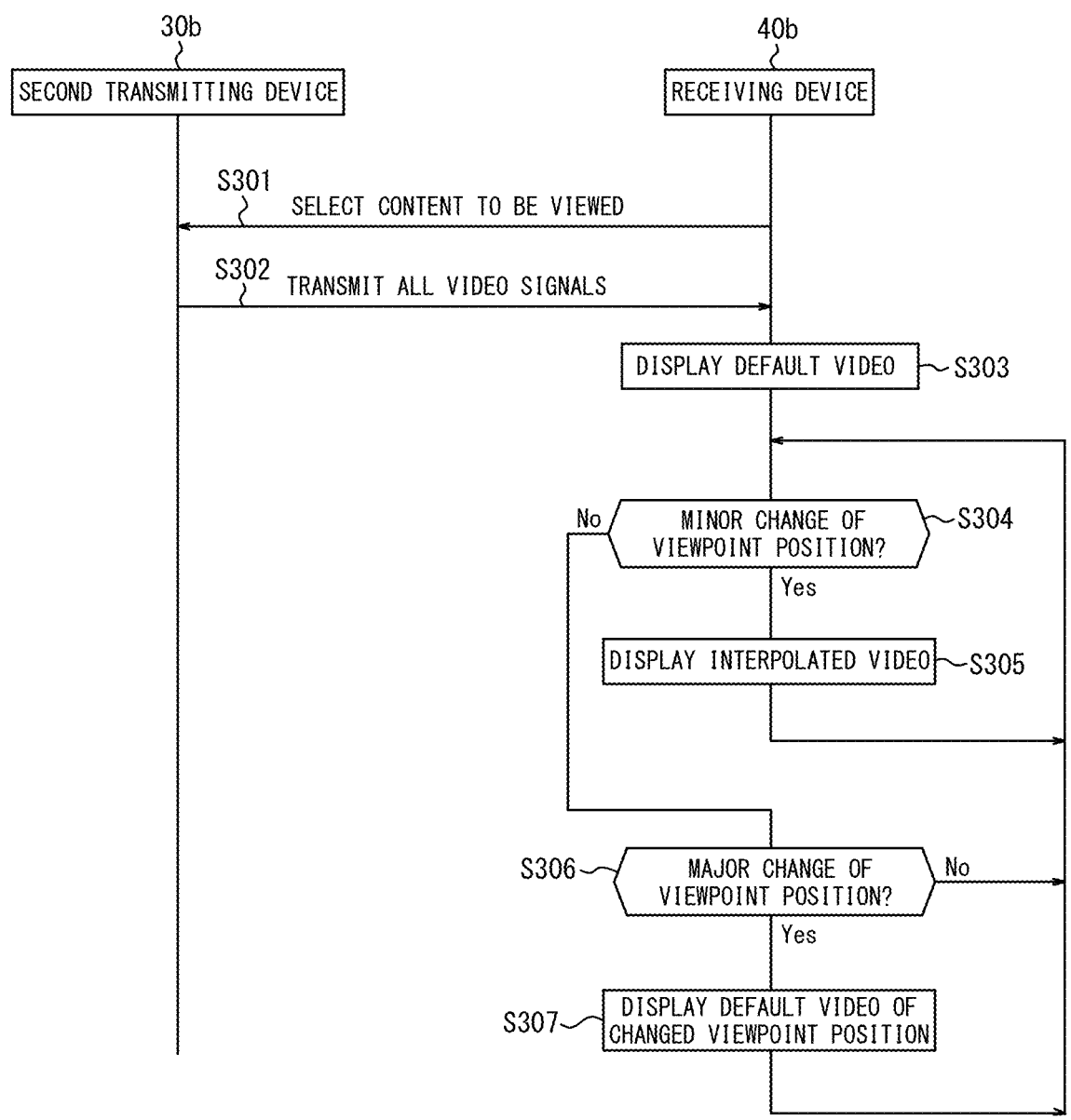
FIG. 11 is a sequence diagram illustrating an example of the operation of the video transmission system according to Embodiment 3.

The operation sequence of the video transmission system 3 according to this embodiment will be described below, with reference to FIG. 11. FIG. 11 is a diagram illustrating the operation sequence between the second transmitting device 30b and the receiving device 40b in the case of IP multicast transmission of video signals.

In step S301, the receiving device 40b transmits a viewing request indicating content selected by the user to the second transmitting device 30b, by the viewing request transmitter 41. The second transmitting device 30b receives the viewing request transmitted from the receiving device 40b, by the viewing request receiver 34.

In step S302, the second transmitting device 30b transmits all video signals relating to the content requested for viewing by the receiving device 40b to the receiving device 40b together with metadata (ID information and position information), by the video transmitter 37b. The receiving device 40b receives the all video signals relating to the content requested for viewing together with the metadata from the second transmitting device 30b, by the video receiver 42.

In step S303, the receiving device 40b decodes the video signals by the video decoder 43. The receiving device 40b then displays the default video of the content requested for viewing, by the display 49.

In step S304, the receiving device 40b determines whether there is a change (minor change) of the viewpoint position not involving a change of ID, by the position determiner 52. In the case where there is a minor change of the viewpoint position, the receiving device 40b advances the process to step S305. In the case where there is no minor change of the viewpoint position, the receiving device 40b advances the process to step S306.

In step S305, the receiving device 40b performs viewpoint interpolation using the plurality of decoded videos and generates video corresponding to the viewpoint position of the user, by the viewpoint interpolator 47b. The receiving device 40b displays the viewpoint-interpolated video by the display 49. The receiving device 40b then returns the process to step S304.

In step S306, the receiving device 40b determines whether there is a change (major change) of the viewpoint position involving a change of ID, by the ID information detector 50. In the case where there is a major change of the viewpoint position, the receiving device 40b detects a request ID, and advances the process to step S307. In the case where there is no major change of the viewpoint position, the receiving device 40b returns the process to step S304.

In step S307, the receiving device 40b acquires default decoded video out of decoded video of a video signal group to which the request ID is assigned, by the viewpoint changer 53. The receiving device 40b then displays the default video by the display 49.

In the case of broadcast transmission, the operation in step S301 is not performed, and, in step S302, the second transmitting device 30b transmits all video signals relating to all content to the receiving device 40b together with metadata (ID information and position information), by the video transmitter 37b. Subsequently, in step S303, the receiving device 40b displays default video of content selected by the user. The operation from step S304 onward is the same as the operation in the case of IP multicast transmission.

As described above, the second transmitting device 30b transmits all video signals to the receiving device 40b together with metadata (ID information indicating first-level grouping and second-level grouping, and position information). Therefore, in the case where the viewpoint position changes, the receiving device 40b can specify necessary decoded video depending on the change of the viewpoint position. Thus, the presently disclosed techniques can be applied to broadcasting or IP multicast distribution of video signals.

<Program>

Figure 12:
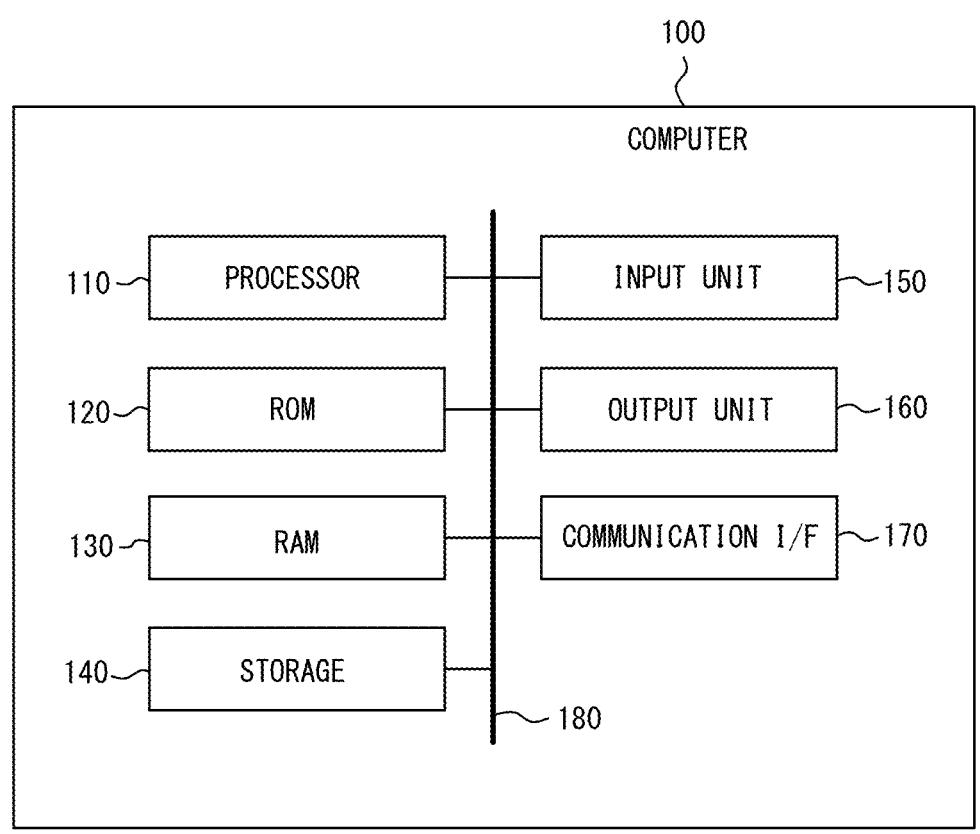
FIG. 12 is a block diagram illustrating the schematic structure of a computer.

A computer capable of executing program instructions may be used to function as each of the foregoing first transmitting device 20, second transmitting device 30, 30a, or 30b, and receiving device 40, 40a, or 40b. FIG. 12 is a block diagram illustrating the schematic structure of a computer that functions as the first transmitting device 20, the second transmitting device 30, 30a, or 30b, or the receiving device 40, 40a, or 40b. A computer 100 may be a general-purpose computer, a special-purpose computer, a workstation, a PC, an electronic notepad, or the like. The program instructions may be program codes, code segments, or the like for executing necessary tasks.

The computer 100 includes a processor 110, a read only memory (ROM) 120, a random access memory (RAM) 130, a storage 140, an input unit (interface) 150, an output unit (interface) 160, and a communication interface (I/F) 170, as illustrated in FIG. 12. The components are communicably connected to each other via a bus 180. The processor 110 is specifically a central processing unit (CPU), a micro processing unit (MPU), a graphics processing unit (GPU), a digital signal processor (DSP), a system on a chip (SoC), or the like. The processor 110 may be composed of a plurality of processors of the same type or different types.

The processor 110 controls each component and performs various arithmetic processes. In detail, the processor 110 reads a program from the ROM 120 or the storage 140, and executes the program using the RAM 130 as a work area. The processor 110 controls each component and performs various arithmetic processes according to the program stored in the ROM 120 or the storage 140. In this embodiment, a program according to the present disclosure is stored in the ROM 120 or the storage 140.

The program may be recorded on a recording medium readable by the computer 100. By using such a recording medium, it is possible to install the program on the computer 100. The recording medium on which the program is recorded may be a non-transitory recording medium. The non-transitory recording medium is not limited, but may be, for example, a CD-ROM, a DVD-ROM, a USB (Universal Serial Bus) memory, or the like. The program may be downloaded from an external device via a network.

The ROM 120 stores various programs and various data. The RAM 130 temporarily stores a program or data as a work area. The storage 140 includes a hard disk drive (HDD) or a solid state drive (SSD), and stores various programs including an operating system and various data.

The input unit 150 includes one or more input interfaces for receiving input operation by a user and acquiring information based on the operation by the user. Non-limiting examples of the input unit 150 include a pointing device, a keyboard, and a mouse.

The output unit 160 includes one or more output interfaces for outputting information. Non-limiting examples of the output unit 160 include a display for outputting information as images and a speaker for outputting information as sound. In the case where the output unit 160 is a touch panel-type display, the output unit 160 also functions as the input unit 150.

The communication interface 170 is an interface for communicating with an external device.

Although the foregoing embodiments have been described as typical examples, it will be apparent to those skilled in the art that many changes and substitutions can be made within the spirit and scope of the present disclosure. Therefore, the present disclosure should not be construed as being limited by the foregoing embodiments, and various modifications and changes can be made without departing from the claims. For example, a plurality of structural blocks or a plurality of processing steps in the foregoing embodiments may be combined into one structural block or one processing step, and one structural block or one processing step in the foregoing embodiments may be divided into a plurality of structural blocks or a plurality of processing steps.

REFERENCE SIGNS LIST 1,2, 3 video transmission system
10 imaging device
20 first transmitting device
21 video receiver
22 video encoder
23 first ID assigner
24 storage
25 video transmitter
30, 30a, 30b second transmitting device
31 video receiver
32 second ID assigner
33 storage
34 viewing request receiver
35, 35a viewpoint information receiver
36 position determiner
37 video transmitter
40, 40a, 40b receiving device
41 viewing request transmitter
42 video receiver
43 video decoder
44 storage
45 viewpoint position detector
46, 46a viewpoint information transmitter
47, 47b viewpoint interpolator
48, 48b operation information adder
49 display
50 ID information detector
52 position determiner
53 viewpoint changer
100 computer
110 processor
120 ROM
130 RAM
140 storage
150 input unit
160 output unit
170 communication interface
180 bus
481 video
482 to 486 operation information

The invention claimed is:

1. A transmitting device configured to transmit, to a receiving device, a plurality of video signals captured from different positions, the plurality of video signals being grouped by a plurality of groups depending on imaging positions at which the video signals are captured, the transmitting device comprising:
a controller configured to assign an ID for identifying each of the plurality of groups, wherein the controller is further configured to:
specify a request ID that is an ID of a video signal corresponding to a change of a viewpoint position of a user of the receiving device; and
a communication interface configured to transmit a video signal to which the ID is assigned, to the receiving device, the communication interface further transmits the video signal to which the request ID is assigned, to the receiving device, wherein the communication interface is further configured to:
transmit a plurality of video signals necessary to generate video corresponding to the viewpoint position of the user in a video signal group to which the request ID is assigned, when the request ID is same as an ID of an immediately previously transmitted video signal; and
transmit a default video signal in the video signal group to which the request ID is assigned, when the request ID is different from the ID of the immediately previously transmitted video signal.

2. The transmitting device according to claim 1, wherein the plurality of video signals are grouped by the plurality of groups depending on the imaging positions, and
the controller is configured to assign a group ID for identifying each of the plurality of groups.

3. The transmitting device according to claim 2, wherein a first-level group out of the plurality of groups is a group to which a plurality of video signals used to generate video from a viewpoint different from an imaging position in the receiving device belong.

4. The transmitting device according to claim 3, wherein a second-level group out of the plurality of groups is one or more first-level groups to which a plurality of video signals captured in a same location belong.

5. The transmitting device according to claim 3, wherein the plurality of video signals belonging to the first-level group are compressed by predictive coding using a correlation between the video signals, when transmitted by the communication interface.

6. The transmitting device according to claim 1, wherein the communication interface is configured to simultaneously transmit all of the plurality of video signals to each of which the ID is assigned, to the receiving device.

7. The transmitting device according to claim 6, wherein the plurality of video signals are grouped by the plurality of groups depending on the imaging positions, and
the controller is configured to assign a group ID for identifying each of the plurality of groups.

8. The transmitting device according to claim 7, wherein a first-level group out of the plurality of groups is a group to which a plurality of video signals used to generate video from a viewpoint different from an imaging position in the receiving device belong.

9. The transmitting device according to claim 8, wherein a second-level group out of the plurality of groups is one or more first-level groups to which video signals captured in a same location belong.

10. The transmitting device according to claim 8, wherein the plurality of video signals belonging to the first-level group are compressed by predictive coding using a correlation between the video signals, when transmitted by the communication interface.

11. The transmitting device according to claim 1, wherein the ID and the video signal are stored in a file of ISO base media file format.

12. A system comprising:
A transmitting device according to claim 1;
A receiving device configured to receive a video signal transmitted from the transmitting device according to claim 1, the receiving device comprising:
a controller configured to decode the video signal to generate decoded video, and acquire a viewpoint position of a user; and
a communication interface configured to transmit viewpoint information indicating the viewpoint position of the user, to the transmitting device.

13. A system comprising:
A transmitting device according to claim 1;
A receiving device configured to receive a video signal transmitted from the transmitting device according to claim 1, together with position information of an imaging device that captures the video signal, the receiving device comprising
a controller configured to decode the video signal to generate decoded video, and acquire a viewpoint position of a user,
wherein the controller is configured to specify respective position information of imaging devices that capture a plurality of video signals necessary to generate video corresponding to the viewpoint position of the user, and perform viewpoint interpolation using decoded video corresponding to the position information.

* * * * *